May 6, 1969          R. E. DE KLOTZ          3,442,083
ADJUSTABLE VARIABLE THRUST PROPULSION DEVICE
Filed July 21, 1967
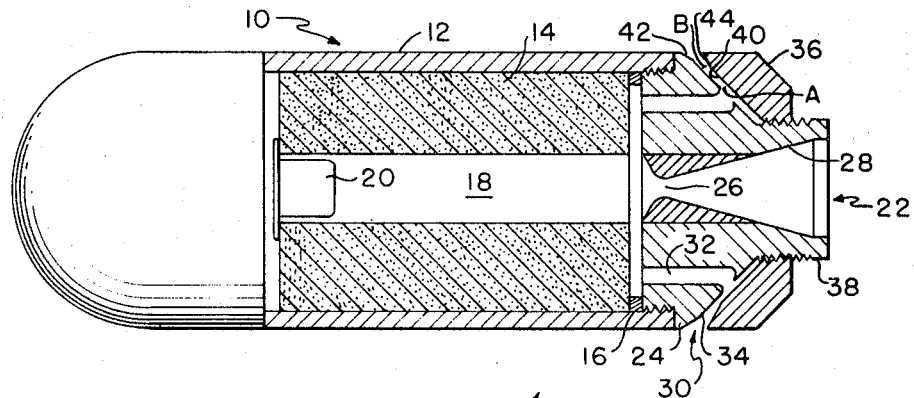
Fig 1
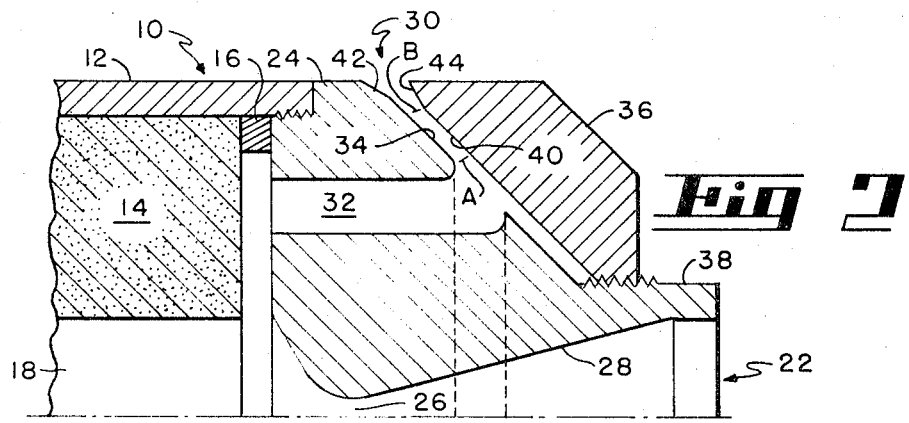
Fig 2
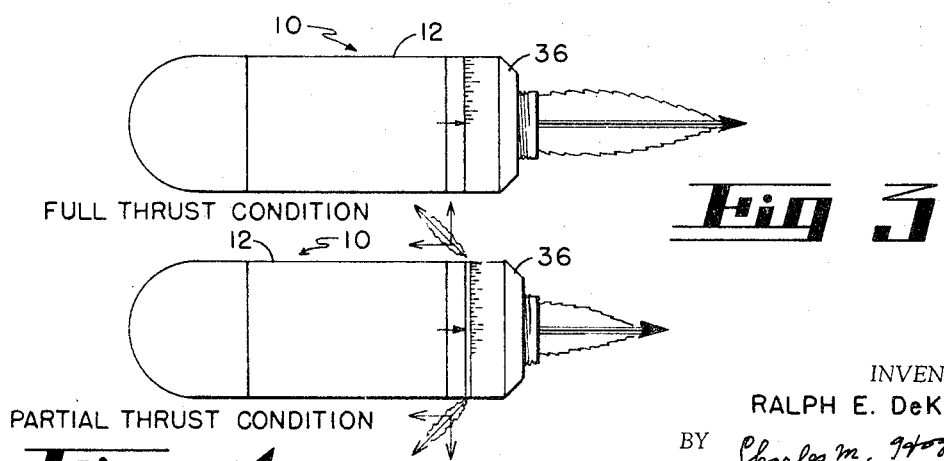
FULL THRUST CONDITION
PARTIAL THRUST CONDITION
Fig 3
Fig 4
INVENTOR.
RALPH E. DeKLOTZ
BY *Charles M. Hogan*
*Gary M. Gron*
ATTORNEYS United States Patent Office 3,442,083
Patented May 6, 1969

3,442,083
ADJUSTABLE VARIABLE THRUST PROPULSION DEVICE
Ralph E. De Klotz, Richmond, Ind., assignor to Avco Corporation, Richmond, Ind., a corporation of Delaware
Filed July 21, 1967, Ser. No. 655,048
Int. Cl. F02k 9/04, 1/20; B64c 15/04
U.S. Cl. 60—229                                                                8 Claims

ABSTRACT OF THE DISCLOSURE

The disclosure illustrates a solid propellant rocket which has bleed ports formed in the rocket casing for discharging a portion of the propulsive gas stream generated by the rocket in a direction to oppose the thrust produced by discharge of the propulsive gas stream through a primary nozzle of the rocket to reduce the rocket's thrust level. A sleeve is threaded onto the rocket casing to vary the flow or throat area of the bleed ports and hence vary the resultant thrust of the rocket.

---

The present invention relates to propulsion devices and more specifically to propulsion devices having a variable thrust output.

In the field of propulsion devices the solid propellant rocket has gained acceptance for a great number of applications owing to its simplicity, economy and effectiveness. A particular application is the use of the solid propellant rocket for rocket-boosted ammunition. The simplicity of the solid propellant rocket and its essentially complete independence from complicated support apparatus enables it to be effectively used under field combat conditions. Another advantage is that a standard propellant charge may be used in the rocket to enable mass production with resulting economies of manufacture and ease of use by military personnel.

The use of a standardized solid propellant rocket, while providing many advantages, however, does raise particular problems. One of the problems is that the use of a standard propellant charge limits the use of the rocket-powered projectile to one type of trajectory. Ordinarily an essentially horizontal flight is used but if conditions in the field change it may be desirable to have a lobbing flight. This trajectory necessitates a substantial reduction in the thrust produced by the rocket but with the standard propellant charge it is extremely difficult to reduce the thrust of the rocket. This is so because the propellant generates a hot gas stream having a substantially fixed total impulse.

In the past it has been proposed to vary the thrust of the solid propellant rocket to achieve greater flexibility by the introduction of extinguishing fluid in the rocket chamber to reduce, if not eliminate, combustion and hence reduce the thrust of the rocket motor. One of the problems with this method is that the apparatus required is extremely complicated and the proper introduction of extinguishing fluid is extremely difficult.

Another approach in the reduction of thrust is to decrease the area of the rocket discharge nozzle to reduce the thrust of the exhaust gases. One way to decrease the area of the rocket discharge nozzle is to provide replacement nozzle bodies having varying nozzle openings. While providing a means to decrease the discharge nozzle area, this approach is espeically unsuitable for combat conditions because of the length of time required to replace nozzle bodies to achieve the desired thrust output.

Accordingly, it is a primary object of the present invention to provide a propulsion device having a simplified economical and positive means of varying the thrust output of the device.

It is a further and more specific object of the present invention to provide a solid propellant rocket propulsion device having an easily variable thrust output.

The above ends are achieved in a broad aspect by providing a propulsion device which comprises means for generating a propulsive fluid stream. A first passageway means is connected to the fluid stream generating means for discharging the stream in a direction to produce a primary thrust. Second passageway means are connected to the fluid stream generating means for discharging a portion of the fluid stream in a direction that produces a resultant secondary thrust in line with and opposing the primary thrust. The relative flow through the first and second passageways is variable to vary the resultant thrust produced by the propulsion device.

In another aspect of the invention the more specific ends of the present invention are achieved by providing a propulsion device as described above which incorporates a solid propellant rocket means to generate the propulsive fluid stream. The solid propellant rocket means is of the type that generates a fluid stream with a substantially fixed total impulse. The relative flow through the first and second passageway means is variable to produce a variable thrust output from the solid propellant rocket.

The above and other related objects and features of the present invention will be apparent from a reading of the following description of the disclosure found in the accompanying drawing and pointed out in the appended claims.

In the drawing:
FIGURE 1 is a longitudinal section view of a rocket-powered projectile incorporating the present invention.
FIGURE 2 is an enlarged fragmentary view of the projectile illustrated in FIGURE 1.
FIGURE 3 illustrates a full thrust condition for the projectile shown in FIGURE 1.
FIGURE 4 illustrates a partial thrust condition for the projectile shown in FIGURE 1.

Referring particularly to FIGURE 1 there is shown a projectile 10 comprising a generally cylindrical outer casing 12. An explosive charge, not shown, may be positioned in the forward end of the projectile. A solid propellant charge 14 is positioned in the interior of the casing 12 and is held in place by a suitable seal 16 and a nozzle casing 24 screwed into the end of the rocket casing 12. The solid propellant charge 14 has a hollow interior to maximize its burning area and provide in part a chamber 18 in which combustion of the propellant 14 takes place to generate a high pressure propulsive fluid stream. A suitable igniter 20 is disposed at one end of the chamber 18 to initiate combustion of the materials contained in the propellant. The propulsive fluid stream is then discharged through a primary convergent divergent discharge nozzle 22 which is formed in the casing 24. The nozzle 22 converges to a throat portion 26 and diverges through a discharge portion 28 to provide acceleration of the propulsive fluid stream to a very high level and produces a primary thrust. A secondary passageway or nozzle, illustrated generally by the reference numeral 30, is provided to generate a secondary fluid stream which opposes the thrust of the gases discharged through the nozzle 22.

As shown particularly in FIGURE 2, the secondary nozzle 30 is formed of a plurality of passageways 32 which extend from chamber 18 to a generally radial face 34 formed on the exterior of the nozzle casing 24. A collar 36 is threaded onto a reduced diameter portion 38 of the casing 24 and has a radial face 40 which is opposite the radial face 34. The faces are so formed to cooperate to form an annular nozzle which discharges a conical fluid stream in a direction generally opposite that of the gases through the nozzle 22. The outer edges of the radial faces 34, 40 are respectively beveled at 42, 44 to produce a divergent nozzle to accelerate the gases discharged through the secondary passage 30. An additional divergent flow path is provided by the fact that the circumferential area of the flow path at the radially outward edge of the passageways 32 (indicated by A) is less than the circumference flow area at the entrance to the beveled portions of casing 24 and the sleeve 36 (indicated by B). The acceleration of gases from the nozzle 30 produces a secondary thrust.

It should be noted that since the gases discharged through the secondary nozzle 30 are discharged around the periphery of the casing 24, the radial thrust components of the stream cancel one another out so that the resultant thrust component is in line with and in a direction to directly oppose the thrust component produced by the gases discharged through the primary nozzle 22. This opposing force then reduces the resultant total thrust acting on the projectile 10.

The opposing thrust may be varied by rotating the collar 36 to displace it towards the radial face 34 a given amount to control the flow of gases through the secondary nozzle 30 by varying the area of the effective throat A of the nozzle 30. By displacing the collar 36 away from the casing the radial face 34, then flow of gases through the secondary nozzle 30 may be increased to increase the opposing secondary force and decrease the resultant force produced by the projectile. This enables the use of a standard propellant charge 14 that produces a gas stream with a fixed total impulse in a projectile that has a variable thrust output.

It should be noted that a solid propellant rocket requires given minimum internal pressure in the chamber 18 to sustain continuous generation of propulsive fluid stream. By increasing the flow area through the secondary nozzle 30 to reduce thrust, the pressure in the chamber 18 is reduced somewhat. However, the angle at which the conical stream is discharged from the secondary nozzle 30 is sufficiently great so that the opening of the throat A is small enough to maintain the given minimum pressure in the chamber 18.

The amount of available thrust from the solid propellant charge 14 is substantially constant and the resultant thrust of the projectile 10 is dependent upon the relative flow through the nozzles 30, 22. The relative flow through the nozzles 30, 22 is primarily determined by the relative area of the nozzle throats A, 26, respectively. Since the displacement of the collar 36 is proportional to the throat area of the secondary nozzle 30, the rotating collar 36 and the casing 24 may be indexed relative to one another, as shown in FIGURES 3 and 4, to enable a rapid positive selection of the total forward thrust of the projectile. A suitable locking means is provided to hold the sleeve in the position selected while the rocket is firing. The vernier scale may be calibrated in terms of pounds of thrust, or in terms of distance to target, whichever is more suitable for the particular field application. With the rotatable sleeve a soldier under the most adverse combat conditions may quickly and positively rotate the sleeve to the desired thrust output or range.

If it is desired to achieve full thrust output from the projectile, the sleeve 36 is rotated to the full thrust of position shown in FIGURE 3, wherein the radial surfaces 40 and 34 abut to seal off and prevent the discharge of gases through the secondary nozzle 30. In this case the entire fluid propulsion stream is discharged through the nozzle 22 which produces the maximum forward thrust attainable from the projectile 10. If it is desired to rapidly select a lower thrust level the collar 36 is rotated to select a secondary nozzle throat area A that will cause the resultant total thrust of the projectile to be at the level indicated on the vernier dial.

It is evident that the invention described above provides a highly effective and reliable means to rapidly select a predetermined level of thrust for a solid propellant rocket. This enables a high degree of flexibility under adverse field combat conditions and because of its simplicity insures against inadvertent selection of an improper thrust level. Additionally it has particular use for spin stabilized or fin stabilized projectiles because the retarding thrust generated by the gases from the secondary nozzle has a resultant thrust coaxial with the thrust generated by the primary discharge nozzle.

While the above invention has been described in connection with a solid propellant rocket, it is evident that other means for generating propulsive fluid streams may be employed with equivalent advantages and without departing from the spirit of the present invention.

Having thus described the present invention, what is claimed as novel and new and desired to be secured by Letters Patent of the United States is:

1. A propulsion device having an adjustable thrust output, said propulsion device comprising:
   means for generating a propulsive fluid stream,
   a first nozzle means having a fixed throat area connected to said fluid stream generating means for discharging a portion of said stream in a direction to produce a primary thrust, said first nozzle means being centrally disposed,
   a second nozzle means concentric with said first nozzle means and branching from said fluid stream generating means for discharging a portion of said fluid stream in a direction that produces a resultant secondary thrust opposing said primary thrust, said second nozzle means extending generally radially outward from said first nozzle means and having a variable throat area, and
   means for adjustably varying the throat area of said second nozzle means to vary the resultant thrust produced by said propulsion device.

2. A propulsion device as in claim 1 wherein;
   said first nozzle means comprises a generally cylindrical casing extending from said fluid stream generating means and having a nozzle passage formed through the axis of said casing,
   said second nozzle means comprises:
   a generally radial face formed around the periphery of said casing,
   interconnecting passageway means extending through said casing from the fluid stream generating means to said radial face,
   a sleeve surrounding said casing and displaceable towards said radial face, said sleeve having a generally radial face cooperating with the radial face of said casing to form at least the throat portion of said second nozzle means,
   the generally radial faces of said casing and said sleeve being oriented to discharge a generally conical stream in a direction to produce said resultant secondary opposing thrust,
   said means for adjustably varying the throat area of said second nozzle means comprises means for adjustably positioning said sleeve from the radial face on the periphery of said casing.

3. A propulsion device as in claim 2 wherein;
   said fluid stream generating means is a rocket means,
   said first nozzle means has a divergent nozzle passage,
   the generally radial faces of said casing and said sleeve have beveled outer edges to form an annular divergent nozzle.

4. A propulsion device as in claim 2 wherein;
   the end of said interconnecting passageway that opens to said radial face is disposed radially inwardly of said beveled edges, whereby the annulus between the end of the interconnecting passageway and said beveled edges forms a divergent passageway.

5. A propulsion device as in claim 3 wherein;
   said rocket means is a solid propellant rocket generating a fluid stream with a substantially fixed total impulse, said sleeve being displaceable towards said radial face to vary the flow ratio between said first and second nozzle means and vary the resultant thrust of said rocket.

6. A propulsion device as in claim 4 wherein;

said solid propellant rocket requires a minimum internal pressure to sustain continuous generation of said fluid stream, said discharge angle which the second nozzle means makes with the first nozzle means is selected so that the throat area of said second nozzle means for maximum opposition of said primary thrust is sufficiently small to maintain the internal pressure of said rocket means at said minimum level.

7. A propulsion device as in claim 6 wherein said adjustable positioning means comprises:

thread means between said sleeve and said cylindrical casing for producing a relative axial displacement between the radial faces on said casing and said sleeve in response to relative rotation, and said sleeve and said cylindrical casing are indexed relative to one another so that a given rotation of said sleeve produces a predetermined level of total thrust.

8. In a rocket-powered projectile, means for providing a preadjustable trajectory comprising;

means for generating a propulsive fluid stream;

first means having a fixed flow area connected to said fluid stream generating means for discharging a primary propulsive fluid stream in a first direction, second means concentric with and branching from said first means for discharging a secondary fluid stream in a direction so that the resultant propulsive force of said secondary stream opposes the propulsive force of said primary fluid stream, means for adjustably varying the rate at which said second means discharges said fluid stream to adjustably vary the resultant propulsive force acting on said projectile.

References Cited

UNITED STATES PATENTS

| | | | |
|---|---|---|---|
| 2,481,059 | 9/1949 | Africano | 60—242 |
| 2,613,497 | 10/1952 | MacDonald | 60—229 |
| 3,177,655 | 4/1965 | White | 60—229 |
| 3,302,890 | 2/1967 | Silver | 60—242 |
| 3,210,937 | 10/1965 | Perry | 60—229 |

FOREIGN PATENTS 1,289,343  2/1962  France.

CARLTON R. CROYLE, *Primary Examiner.*

U.S. Cl. X.R.

60—253, 263; 239—265.31